J. F. BARKER.
ADJUSTABLE PULLEY-BLOCK HANGER.
No. 182,265. Patented Sept. 19, 1876.
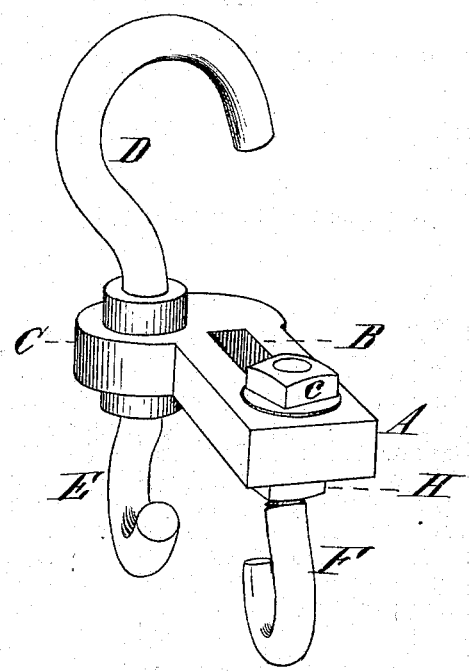

UNITED STATES PATENT OFFICE.

JOHN F. BARKER, OF SPRINGFIELD, MASSACHUSETTS.

IMPROVEMENT IN ADJUSTABLE PULLEY-BLOCK HANGERS.

Specification forming part of Letters Patent No. 182,265, dated September 19, 1876; application filed July 17, 1876.

*To all whom it may concern:*

Be it known that I, JOHN F. BARKER, of Springfield, in the State of Massachusetts, have invented a new and useful Adjustable Pulley-Block Hanger; and that the following is a full, clear, and exact description thereof, reference being had to the accompanying drawing, making a part of this specification, and to the letters of reference marked thereon.

My invention relates to a device for hanging and adjusting pulley-blocks with reference to each other, to avoid undue friction and wear of the rope, and to require the minimum amount of power commensurate with the weight to be raised; and it consists of a slotted bar having a hook or loop by which it is suspended, and hooks or loops beneath upon which to hang the pulley-blocks, one of which hooks is located out of line with the other, and is made adjustable or movable toward or from the other, as will be more fully hereinafter explained.

The drawing is a perspective view of my invention.

A is the bar, of any suitable length, according to the distance apart which it is desired to hang the pulley-blocks, having the hook D screwed into the upper side, and the hook E attached to the lower side. The bar is provided with a slot, B, extending along its length, and the upper end or shank of a hook, F, having a screw-thread made thereon, is passed up through this slot, with a collar or nut, H, below the bar, and a nut, *c*, turned onto the shank above the bar, whereby, by loosening the nut, the hook F may be moved to any desired position along the bar, and secured by turning down the nut against the bar.

The object of this invention is to cause the ordinary pulley-blocks, when two are used together, to adjust themselves with each other, after being hung, whenever the rope to which the power is applied is carried to different positions or angles with reference to the first block over which the rope passes, and also to obviate the friction of the rope against the side of the block.

For example, suppose two blocks to be hung upon hooks made fast in beams, and a heavy weight is to be raised, using a windlass as a means of applying the power, and upon which the rope is wound. As the rope traverses the cylinder or drum from one end to the other in being wound, it assumes positions at different angles to the first block, and rubs against the side of the block, sometimes on one side and sometimes on the other, wearing away the rope, and creating an amount of friction which requires no inconsiderable additional power to overcome.

My invention entirely obviates this trouble. The hook D is hooked over a bar or into a ring, and one of the pulley-blocks is suspended upon the hook E, and the other upon the hook F, the latter first being secured in the slot B at a point nearer to or farther from the hook E, according as the power is to be applied in raising the weight more directly beneath the hook F, or farther away.

As the rope is carried into positions at different angles with the block hung at F, or traverses from end to end of the windlass, the whole bar A, with the hooks E and F, vibrate, or turn from side to side upon the hook D as a pivot, the blocks readily assuming any position freely, and without undue friction of the rope against the side of either.

As the first block, upon which the power is first exerted, is hung upon the hook F, it therefore hangs directly beneath the slot B, at any point in its length, and the hook E is located at one side of the line of said slot, as is clearly shown in the drawing, so that the center of gravity of each block shall come directly beneath their respective hooks E and F, and the blocks be in their proper positions, one with the other, so that the rope may extend from the lower pulley to the respective pulleys at the hooks E and F, without undue friction against the side of either block.

In first adjusting the device to its proper or desired position with reference to the location where the power is to be applied, the hook D has a screw-thread made upon its shank, and is screwed into the bar A, and it may be turned any part of a revolution to allow the bar A to project in the desired direction.

It is evident that in place of either hook D,

E, or F, a ring or loop might answer the purpose equally well, although I prefer a hook, for convenience.

Having thus described my invention, what I claim as new is—

An adjustable pulley-block hanger, consisting of the slotted bar A, the movable hook F, the hook E, set out of line with the slot B, and hook F secured therein, and the hook D, operating substantially as and for the purpose described.

JOHN F. BARKER.

Witnesses:
T. A. CURTIS,
F. C. RICE.